United States Patent [19]

Welsh

[11] 4,450,148

[45] May 22, 1984

[54] PREPARATION OF MANGANITE, MNOOH

[75] Inventor: Jay Y. Welsh, Catonsville, Md.

[73] Assignee: Chemetals Incorporated, Baltimore, Md.

[21] Appl. No.: 428,539

[22] Filed: Sep. 30, 1982

[51] Int. Cl.$^3$ ............................................. C01G 45/02
[52] U.S. Cl. .................................... 423/605; 423/395; 423/50
[58] Field of Search .......................... 423/605, 50, 395

[56] References Cited

U.S. PATENT DOCUMENTS 3,780,159 12/1973 Welsh .................................. 423/605
4,006,217 2/1977 Faber et al. .......................... 423/605

OTHER PUBLICATIONS

Chemical Abstracts, 26, p. 5025, abstract of C. Montemartini and E. Vernazza, Industria Chimica 7, 577-582 (1932).
Bailar et al., "Comprehensive Inorganic Chemistry", Pergamon Press, Oxford, 1973, p. 825.

Primary Examiner—Herbert T. Carter
Attorney, Agent, or Firm—Lyon & Lyon

[57] ABSTRACT

A process of preparing manganite, MnOOH, from an aqueous manganese (II) nitrite solution by a fast batch decomposition in the presence of an "active" solid surface.

4 Claims, No Drawings

PREPARATION OF MANGANITE, MNOOH

FIELD OF THE INVENTION

The invention relates to an improved process for preparing manganite, MnOOH, from an aqueous solution containing manganese (II) nitrite.

BACKGROUND OF THE INVENTION

Manganese oxide hydrate, α-MnO(OH), also known as groutit, may be prepared by the chemical or electrochemical reduction of γ-manganese dioxide, according to U.S. Pat. No. 3,427,128. The crystal structure of groutit has been described by Collin and Lipscomb in *Acta Cryst.*, Vol. 2, pp. 104–106 (1949).

C. Montemartini and E. Vernazza in Industria Chimica, volume 7, pages 557–82 (1932) describe the decomposition of manganese (II) nitrite with water to yield manganese (II) hydroxide, which further reacts to form $Mn_2O_3$.

According to U.S. Pat. No. 4,006,217 manganese (II) hydroxide may be oxidized to form MnOOH. The MnOOH product may then be air-oxidized to form manganese dioxide. However, this process has the disadvantage of being very time-consuming.

SUMMARY OF THE INVENTION

The present invention provides an improved process for the preparation of manganite, MnOOH, from an aqueous solution containing manganese (II) nitrite. In the present invention an aqueous solution containing manganese (II) nitrite is contacted with an active surface (as described below) to promote the formation of manganite. The aqueous manganese (II) nitrite solution in contact with an active surface is heated, and decomposed to form manganite. Surprisingly the manganite product formed by the decomposition of manganese (II) nitrite, according to the present invention, is alkali and alkaline-earth free, even if the original aqueous manganese (II) nitrite solution contained alkali and/or alkaline earth compounds.

The manganite produced by the present invention is useful to produce $Mn_3O_4$. As mentioned above, the manganite produced by the present invention may also be air-oxidized to produce manganese dioxide.

It is an advantage of the present invention that the manganite product formed by the decomposition of manganese (II) nitrite is characterized by a high surface area.

It is another advantage of the present invention that the manganite product formed by the decomposition of manganese (II) nitrite filters and washes exceptionally well.

A further advantage of the present invention is that the manganite product produced by the decomposition of manganese (II) nitrite is alkali and alkaline-earth free, even if the original aqueous manganese (II) solution contained alkali and/or alkaline-earth compounds.

Still other advantages of the invention will be readily apparent to those of ordinary skill in the art from the detailed description of the invention which follows.

DETAILED DESCRIPTION OF THE INVENTION

The process for the production of manganite, MnOOH, from an aqueous solution containing manganese (II) nitrite may be described by the equation:

$$Mn(NO_2)_2 + 2H_2O \rightarrow 4(MnOOH) + 8NO + Mn(NO_3)_2$$

The chemistry of manganese (II) nitrite is quite complex, especially with respect to its decomposition.

It has been observed that the rate of decomposition of manganese (II) nitrite is second order with respect to nitrite concentration. That is, the rate of decomposition of manganese (II) nitrite varies as the square of the nitrite concentration. It has also been observed that an aqueous manganese (II) nitrite solution can be heated far above its equilibrium decomposition temperature if no "active" solid surface is present. Surprisingly, it has been found that an aqueous manganese (II) nitrite solution can be heated approximately 40° to 50° C. above its equilibrium decomposition temperature, without effecting decomposition of manganese (II) nitrite, if no "active" solid surface is present. It has been found that the "active" solid surface necessary to effect the decomposition of manganese (II) nitrite is the surface of manganite particles.

In the presence of an "active" solid surface, appreciable decomposition of aqueous manganese (II) nitrite solution can occur at temperatures above 30° C. The decomposition of manganese (II) nitrite has a very high activation energy, about 33,000 calories per mole. This means that the rate of reaction is markedly affected by temperature. The rate of reaction changes by a factor of about five for each 10° C. change in temperature. Control of the temperature is therefore critical in the process of the present invention.

pH of the aqueous manganese (II) nitrite solution is also quite critical because of the possibility of loss of nitrite ion by decomposition to nitric oxide (NO) and nitric acid. The equations involved are:

$$Mn(NO_2)_2 + 2 HNO_3 \rightarrow MN(NO_3)_2 + 2HNO_2$$

$$3HNO_2 \rightarrow 2NO + HNO_3 + H_2O$$

The loss of nitrite ion by decomposition according to the above equations would be much worse if the nitrite ion were not strongly complexed. It has been experimentally observed that the effective strength of the nitrite ion in the aqueous manganese (II) nitrite solution is only about 0.04 times its actual value. This surprising, experimentally observed, fact is necessary for the successful operation of the process of the present invention.

Practically, the decomposition of aqueous manganese (II) nitrite to produce manganite should satisfy at least two conditions:

First, it is important that the decomposition of the aqueous manganese (II) nitrite to be substantially complete; and Secondly, it is important that the manganite product should have a high surface area, preferably at least one square meter per gram. This requires that the manganite crystals be very small. The process of the present invention satisfies both of these factors.

The process of the present invention produces very small manganite crystals in the form of uniform, soft agglomerates by a fast batch decomposition. The manganite product of this fast batch decomposition permits exceptional filtration rates. The virgin aqueous manganese (II) nitrite solution used usually is at an initial temperature of about 35° C. It has been found that the fast batch decomposition of the present invention is preferably heated to a final temperature of at least about 105° C., but no more than about 125° C. At temperatures above about 125° C. it has been found that manganese (II) nitrate product decomposes to form manganese dioxide. The fast batch decomposition of the present invention is continued for a period sufficient to effect substantially complete decomposition of the aqueous manganese (II) nitrite starting material.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. A process for preparing alkali and alkaline-earth free manganite, comprising the steps of:
   contacting an aqueous solution containing manganese (II) nitrite with an active surface to promote the formation of manganite,
   heating said aqueous solution containing manganese (II) nitrite to a temperature sufficient to effect formation of manganite, and
   decomposing said aqueous solution containing manganese (II) nitrite to form an alkali and alkaline-earth free manganite having a high surface area.

2. The process set forth in claim 1, wherein said active surface is a manganite surface.

3. The process set forth in claim 1, wherein said temperature sufficient to effect formation of manganite is between about 105° C. and 125° C.

4. The process set forth in claim 1, wherein said manganite has a surface area of at least about one square meter per gram.

* * * * *

UNITED STATES PATENT AND TRADEMARK OFFICE
CERTIFICATE OF CORRECTION

PATENT NO. : 4,450,148
DATED : May 22, 1984
INVENTOR(S) : Jay Y. Welsh

It is certified that error appears in the above-identified patent and that said Letters Patent are hereby corrected as shown below:

In the heading:

[54] PREPARATION OF MANGANITE, MnOOH

Column 2, line 1, should read:

$$5\ Mn(NO_2)_2 + 2\ H_2O \rightarrow 4(MnOOH) + 8\ NO + Mn(NO_3)_2$$

Column 2, line 39, should read:

$$Mn(NO_2)_2 + 2\ HNO_3 \rightarrow Mn(NO_3)_2 + 2\ HNO_2$$

Signed and Sealed this

Fifteenth Day of January 1985

[SEAL]

*Attest:*

*Attesting Officer*

GERALD J. MOSSINGHOFF

*Commissioner of Patents and Trademarks*